INVENTOR
SAMUEL J. RUPERT
BY Olsen and Stephenson
ATTORNEYS

INVENTOR
SAMUEL J. RUPERT
BY Olsen and Stephenson
ATTORNEYS

Sept. 9, 1969            S. J. RUPERT           3,465,931
METHOD OF AUTOMATICALLY TRIM FINISHING BLOW
MOLDED PLASTIC ARTICLES
Original Filed Nov. 6, 1964           6 Sheets-Sheet 5

INVENTOR
SAMUEL J. RUPERT
BY Olsen and Stephenson
ATTORNEYS

Sept. 9, 1969  S. J. RUPERT  3,465,931
METHOD OF AUTOMATICALLY TRIM FINISHING BLOW
MOLDED PLASTIC ARTICLES
Original Filed Nov. 6, 1964  6 Sheets-Sheet 6

INVENTOR
SAMUEL J. RUPERT
BY Olsen and Stephenson
ATTORNEYS

United States Patent Office 3,465,931
Patented Sept. 9, 1969

3,465,931
METHOD OF AUTOMATICALLY TRIM FINISHING BLOW MOLDED PLASTIC ARTICLES
Samuel J. Rupert, Ann Arbor, Mich., assignor to Hoover Ball and Bearing Company, Saline, Mich., a corporation of Michigan
Original application Nov. 6, 1964, Ser. No. 409,384, now Patent No. 3,351,981, dated Nov. 14, 1967. Divided and this application July 17, 1967, Ser. No. 653,790
Int. Cl. B26f 3/00, 3/02; B65h 35/00
U.S. Cl. 225—1                 3 Claims

ABSTRACT OF THE DISCLOSURE

A method of and an apparatus for initially blow molding a plurality of hollow plastic articles and thereafter trimming the articles so that the top walls and tails thereof formed in the blow molding operation are removed. Each of the molds has a cavity for defining the blown article so that it has an annular bulbous projection adjacent to the top wall, and each mold has a notch at the bottom parting line so that the tail is an extension in a vertical plane containing the axis of the blown article. The trim apparatus includes a transfer bracket positioned below the molds to receive the articles discharged therefrom. The articles are supported by resting the bulbous projections on portions of the transfer bracket, and the articles are moved by the transfer bracket horizontally in a direction perpendicular to the vertical plane of the tail to locating brackets which cooperate with the supporting portions of the transfer bracket to define annular nesting portions for the articles. During movement, the tails on the articles are moved across a stripper bar which tears the tails off the articles. In the final position of the transfer bracket, each article is vertically aligned with an annular cutter which on downward movement trims off the top of the article and part of the bulbous projection leaving an outwardly flared lip.

CROSS-REFERENCES TO RELATED APPLICATIONS

This application is a division of copending application Ser. No. 409,384, filed Nov. 6, 1964, now Patent No. 3,351,981, and it refers in part to blow molding machines shown in applications Ser. No. 236,382, filed Nov. 8, 1962, now Patent No. 3,217,357, and Ser. No. 404,759, filed Oct. 19, 1964, now Patent No. 3,335,457, and to transfer mechanisms shown in copending application Ser. No. 416,991, filed Dec. 9, 1964, now Patent No. 3,417,428.

SUMMARY OF THE INVENTION

This invention relates generally to a method of automatically forming plastic containers, and more particularly to an improved method of automatically trim finishing blow molded plastic articles.

Blow molded plastic articles direct from a blow molding machine are usually encumbered with excess unwanted plastic material which must be removed in order to finish the article. For example, one type of blow molding machine includes a die head which is capable of extruding a downwardly extending tubular parison which is open at its lower end. Horizontally movable mold sections disposed below the die head move into engaged positions in which they pinch the lower end of the parison so as to close it and form a mold cavity around the parison, following which the parison is blown into conformity with the mold cavity. When the plastic cools, the portion of the parison which was pinched together by the molds forms a tail which is integral with and depends from the bottom of the article. In order to properly form the upper end of the article, which is subsequently stripped from the heated plastic remaining in the die head, it is usually necessary to design the mold so that the upper end of the article is provided with excess plastic. In finish trimming such an article, so as to remove the tail and also remove the excess material at the upper end of the article, it is desirable to provide automatic apparatus which is oriented with a portion of the blown article which, irrespective of variations in shape of the articles, is always in the same location. It is also desirable to provide trimming apparatus which moves the blown article in a downward direction away from the die head so as not to interfere with a subsequently formed downwardly moving parison to thereby avoid delays in the operation of the machine. Apparatus which can be adapted to blow molding machines having different numbers of die heads is desirable as is a minimum of floor space requirements adjacent the blow molding machine. It is an object of this invention, to provide an improved method for trim finishing blow molded articles which accomplishes the above-described objectives, is oriented with the tail on the container, since the tail is always in vertical alignment with the die head, is disposed so that a blown container is initially moved downwardly away from the die head onto the trim finishing apparatus and which is also oriented so that the trim cutters which remove excess material from the upper ends of the containers are readily located in positions in which they are automatically located with respect to blown articles.

The improved method of this invention is particularly useful in the trim finishing of containers which are designed for use as the well known oil cans used in service stations for filling vehicle crankcases. Such oil cans are conveniently formed of metal. This invention provides apparatus for automatically forming a plastic container having an open top defined by an outwardly flared lip to which a metal cover is attached following filling of the container with oil. In the method of this invention, the blow molded article, as it comes from the blow molding machine, is of a shape such that it has a bottom wall, an upwardly extending cylindrical side wall which terminates at its upper end in an outwardly flared side wall extension or projection which is of a length greater than the length of the lip desired on the final finished container. A radially outwardly and downwardly sloped top wall has a central opening and an outer edge which is formed integral with the side wall extension. During blow molding of these articles in a multihead blow molding machine of the type described above, each article is formed, as a result of the pinching of the lower end of the parison, with a downwardly extending tail formed integral with the bottom wall. These tails are always in the same location, namely, in a plane extending through the center lines of the die heads. The trim apparatus is thus oriented with respect to this plane and includes a transfer bracket which is disposed below the blow molded articles as they either fall or are moved downwardly from the die heads. The articles are supported by resting the side wall extensions on the transfer bracket which catches the downwardly traveling articles from the blow molding machine and moves the articles horizontally in a direction perpendicular to the orienting plane toward a locating bracket which is horizontally aligned with the transfer bracket. The transfer bracket moves the blow molded articles suported thereon in one direction into engagement with the locating bracket, and the brackets cooperate to form annular nests which support the article side wall extensions, following which the articles are moved further in the same direction to positions in which the nests and thus the articles are vertically aligned with the top trim apparatus. During such movement, the tails on the articles are moved horizontally across a stationary stripper bar which tears the tails off the lower ends of the articles. In the final locating position of the locating bracket, each article is vertically aligned with an annular cutter which is movable downwardly into cutting engagement with the top wall and the side wall extension at a position slightly radially outwardly of the side wall. Once the side wall extension is cut off in this manner, the container is readily moved downwardly off the brackets onto a conveyor or the like which takes the final trimmed containers to a filling or packaging station.

Further objects, features and advantages of this invention will become apparent from a consideration of the following description, the appended claims, and the accompanying drawing in which:

Figure 1:
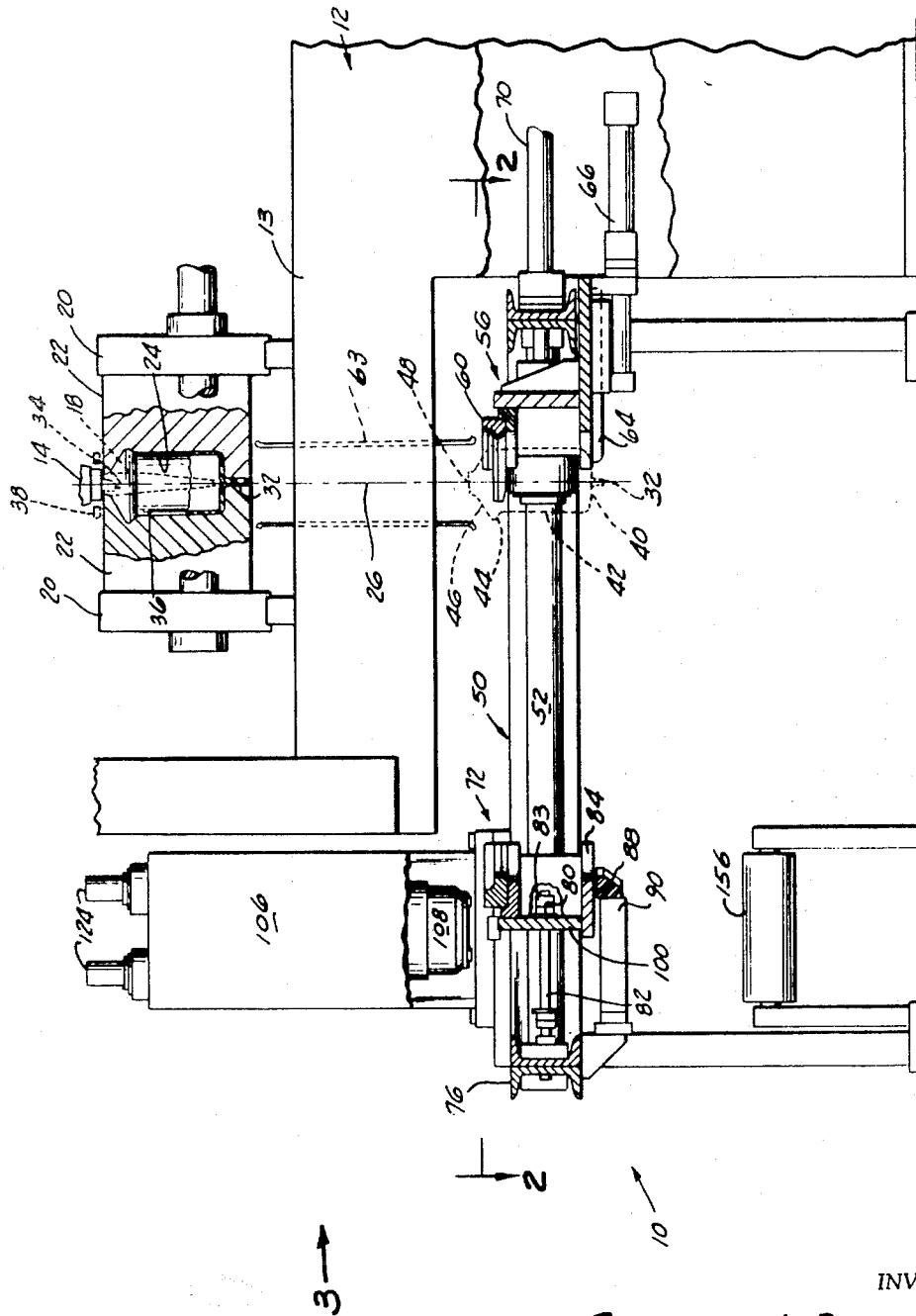
FIGURE 1 is a side elevational view of the container trim and finishing apparatus used to carry out this invention, shown in assembly relation with a blow molding machine, only a fragmentary front end portion of which is shown.

With reference to the drawing, the trim apparatus indicated generally at 10 is illustrated in FIG. 1, in assembly relation with a blow molding machine 12 only a fragmentary front end portion of which is shown since only the illustrated portions of the machine 12 are pertinent to the apparatus 10 of this invention. The machine 12 is of the type shown in detail in copending application Ser. No. 236,382, filed Nov. 3, 1962, and copending application Ser. No. 404,759, filed Oct. 19, 1964, both of which are assigned to the assignee of this invention, and includes a main frame 13, and a plurality of vertical die heads 14 which are supplied with plastic in a heated semifluid condition by an extruder 16 so that each die head is capable of forming a downwardly extending parison 18 (FIG. 1) the lower end of which is originally open. Mold carrying platens 20 are slidably mounted on the main frame 13 at a position below the die heads 14 and carry mold sections 22 which are movable horizontally toward each other into engaged positions in which they form a plurality of mold cavities 24 (only one of which is shown) which correspond in number to and are disposed in a centered relation with and below the die heads 14. The traverse center lines of the die head 14 are disposed in a plane 26 and the parting line of each of the mold cavities formed by the mold sections 22 is also disposed in the plane 26. The longitudinal center lines of the die heads are indicated at 30 in FIG. 3 and are mentioned at this time because they are of significance later in the desciption of the apparatus 10.

In the operation of the machine 12, when the mold sections 22 are moved horizontally toward each other into engagement as shown in FIG. 1, they pinch the lower end portion 32 of each parison 18 and air under pressure is subsequently discharged into the closed parison 18 from a discharge nozzle 34 so as to expand the parison 18 into conformity with the mold cavity 24 and form the plastic article indicated at 36 in FIG. 1. The mold sections 22 are subsequently moved apart, in the conventional operation of the machine 12, and a stripper bracket 38 is moved downwardly into engagement with the top side of the plastic article 36 so as to strip it from the heated plastic remaining in the die head 14. The formed article 36 then falls downwardly and a subsequent parison 18 is immediately extruded from the die head 14. Plastic is extruded concurrently from all three of the die heads 14, so that in the illustrated embodiment of the invention three articles 36 are formed each time the mold sections 22 are moved apart so as to be out of the path of movement of articles stripped from the die heads 14.

As shown in FIG. 1 the pinched portion 32 of the parison 18 forms a tail on the bottom wall 40 of the article 36. Also as shown in FIG. 1, the mold cavity 24 for each die head 14 is of a shape such that each article 36 has a cylindrical side wall 42 which extends upwardly from the bottom wall and is formed at its upper end with an outwardly flared extension or projection 44. The article 36 has a radially outwardly and downwardly sloping top wall 46 which is formed integral at its outer edge with the outer edge of the projection 44. Each container 36 also has its top wall 46 formed with a central opening 48 of a size approximating the original diameter of the parison 18.

The apparatus 10 of this invention includes an open framework type frame 50 which is floor mounted below the front end portion of the main frame 13 of the machine 12. The frame 50 has a pair of horizontal guide rods 52 mounted thereon so that the rods 52 extend horizontally in a direction fore and aft of the machine 12 and are spaced in a direction transversely of the machine 12. Slidably mounted on the guide rods 52 adjacent one end 54 of the frame 50 is a transfer bracket 56 which includes bearings 58 mounted on the guide rods 52. The transfer frame 56 also includes three generally semi-circular nest portions or halves 60 each of which is disposed below a die head 14 in a position to intercept and catch articles 36 falling downwardly therefrom. Each nest portion 60 includes end extension fingers 62 spaced apart a distance such that they will engage the underside of the side wall projection 44 on the article 36 as it falls downwardly from a vertically aligned die head 14. Wire guides 63 are mounted on the machine 12 at positions below the die heads 14 so as to guide articles 36 falling downwardly therefrom to supported positions on the fingers 62, in which positions, the containers 36 are spaced slightly forwardly from centered positions with the nest portions 60 as illustrated in broken lines in FIG. 2. This insures a catching without any tipping or falling off, of each downwardly falling article 36.

A tail pusher bar 64 is slidably mounted on the transfer bracket 56 at a position immediately below and in alignment with each of the nests 60. An air spring assembly 66 associated with each of the pusher bars 64, urges the bar 64 in a direction to the left as viewed in FIG. 1 to the stop position of the bar 64 shown in FIG. 1. A fluid actuated cylinder assembly 68 mounted on the frame 50 has its piston rod 70 engaged with the transfer frame 56 for moving the transfer frame 56 toward the left as viewed in FIG. 2. The cylinder assembly 68, on extension of the piston rod 70, is operable to move the transfer frame 56 toward a container locating bracket 72 which has bearings 74 slidably supported on the guide rod 52 at a position adjacent the end 76 of the frame 50. Springs 78, extended between stationary brackets 80 on the frame 50 and the locating frame 72, continually urge the locating frame 72 in a direction toward the right as viewed in FIG. 2. Stops 80 carried by threaded rods 82 secured to the frame 50 engage a frame member 100 which forms a part of the locating bracket 72 and prevent it from moving further toward the right under the action of the springs 78 from its position shown in FIG. 2. Nuts 83 on the rods 82 are adjustable to adjust the positions of the stops 82.

Figure 4:
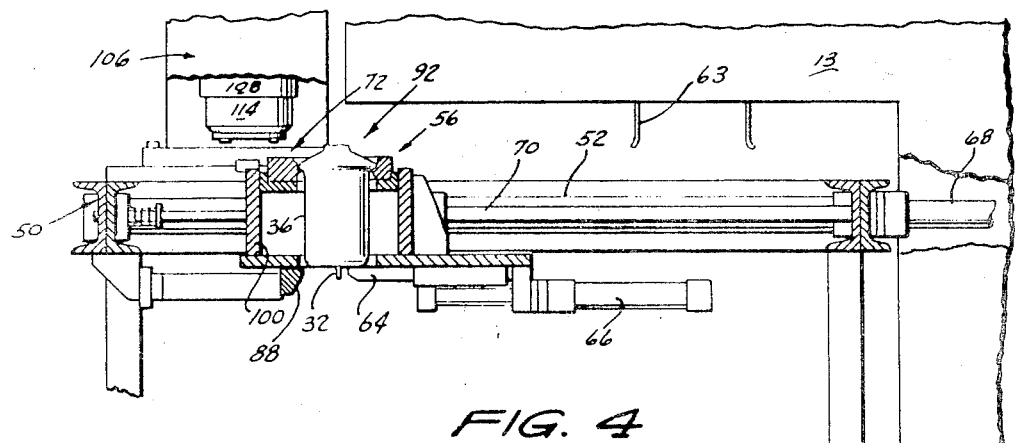
FIGURE 4 is a fragmentary side elevational view of apparatus used to carry out this invention showing the transfer bracket moved to a position in which the containers thereon are initially gripped between the locating and transfer brackets.

Semicircular nest portions 84 are mounted on the locating bracket 72 at positions in horizontal alignment with the nest portions 60 on the transfer bracket 56. As a result, the transfer bracket 56 is movable toward the left, as viewed in FIG. 2, to a position in which the container 36 by the stripper bar portion 86 which oper-initially moved rearwardly on the transfer frame 56 into positions centered with respect to the nest portions 60 and in which the article side wall projections 44 are clamped between horizontally aligned nest portions 60 and 84 as shown in FIG. 4. In this position, the tail 32 on each container 36 is engaged with a recessed V-shape portion 86 of a stripper bar 88 which is mounted in a fixed position on frame members 90 carried by the frame 50. The tail pushers 64, which have their terminal ends 65 formed of a projecting V-shape to fit in the recessed stripper bar portions 86, yieldably maintain the tails 32 in engagement with the portions 86 of the stripper bar 88. On subsequent movement of the transfer bracket 56 toward the left in FIG. 2, each tail 32 is torn off its container 36 by the stripper bar portion 86 which operates to tear the tail from its ends 93 toward its center, since it engages the ends first, with the tail pusher bar 64 moving rearwardly against the yielding action of its air spring 66 so as to maintain the tails 32 in tight engagement with the stripper bar 88. When an article 36 has been moved past the stripper bar 88, as shown in FIG. 5, the tail 32 has been stripped from the article 36 and is gripped between the tail pusher 64 and the stripper bar 88.

Figure 8:
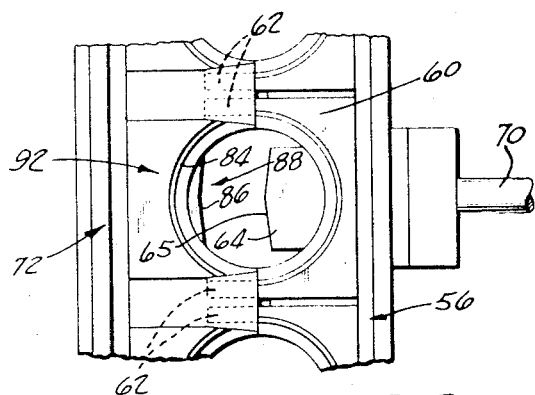
FIGURE 8 is a fragmentary top view showing the brackets in nest forming positions.

The brackets 56 and 72 are now in positions in which the nest portions 60 and 84 form substantially annular nests 92 (FIGS. 4 and 8) on which the annular article side wall projections 44 are gravity supported. As shown in FIG. 5A, each nest 92 has an annular upright wall portion 94 which applies horizontal clamping forces directed radially inwardly to the bulbed out upper end portion of the article 36 supported on the nest. Immediately below the wall 94, each nest 92 includes a radially inwardly directed annular shelf 96 which is positioned in supporting engagement with the underside of the article side wall projection 44. The shelf 96 is of a length, in a direction radially of the article 36, less than the length of the projection 44 measured in the same direction. Immediately below the shelf 96, the nest 92 is relieved, so that it has a surface 98 spaced radially outwardly from the article side wall 42.

Figure 2:
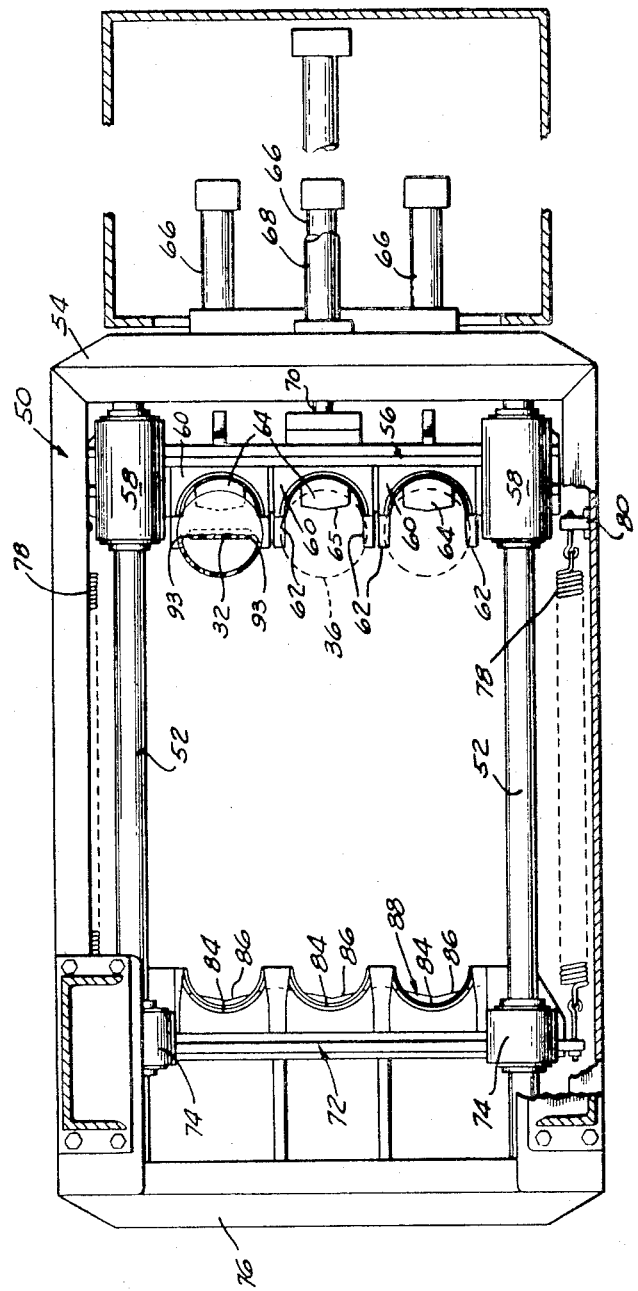
FIGURE 2 is a horizontal sectional view looking substantially along the line 2—2 of FIG. 1, and showing blow molded articles supported on the locating bracket, one article being shown in full lines and the remainder in broken lines for purposes of clarity.
Figures 5, 5A:
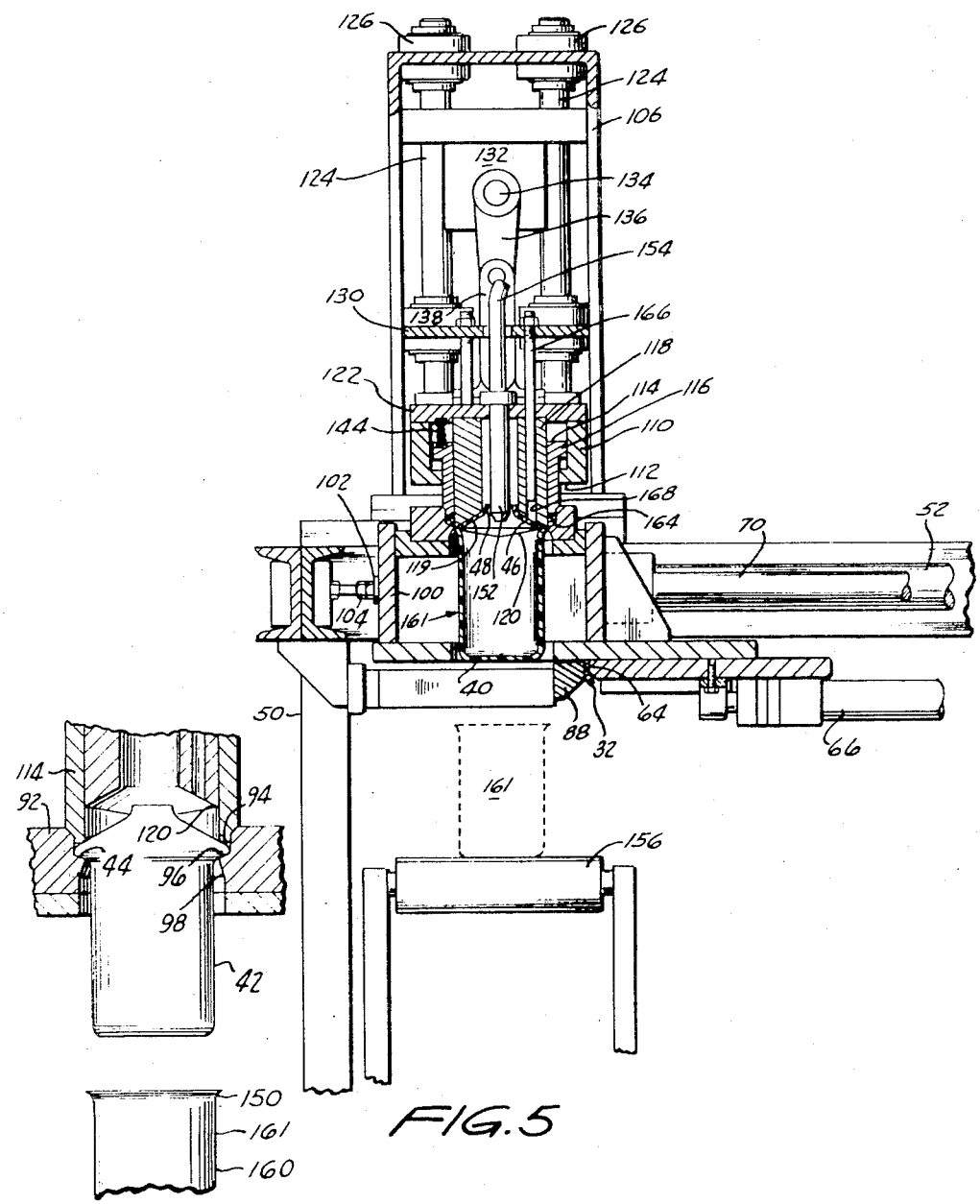
FIGURE 5 is a fragmentary side elevational view similar to FIGS. 1 and 4 showing the transfer and locating brackets in positions in which the articles thereon are aligned with the top trim means which has been advanced downwardly into engagement with the articles.
FIGURE 5A is a fragmentary enlarged sectional view illustrating the position of each container relative to its support nest and top trim cutter.

With the articles 36 supported on the nests 92 as shown in FIGS. 4 and 5A, the cylinder 68 is actuated to provide for further movement of the transfer frame 56 toward the left as viewed in FIG. 2. This provides for a corresponding movement of the locating frame 72 on the guide bars 52 against the pressure of springs 78. Such movement is continued until the member 100 (FIG. 5), which constitutes part of the locating bracket 72, engages stops 102 mounted on the bars 82 in positions which are adjustable by manipulation of stop nuts 104 on the rods 82. The stops 102 are located so that when the frame member 100 engages the stops 102, the nests 92, and thus the articles 36 supported thereon, are in trim positions.

Figure 3:
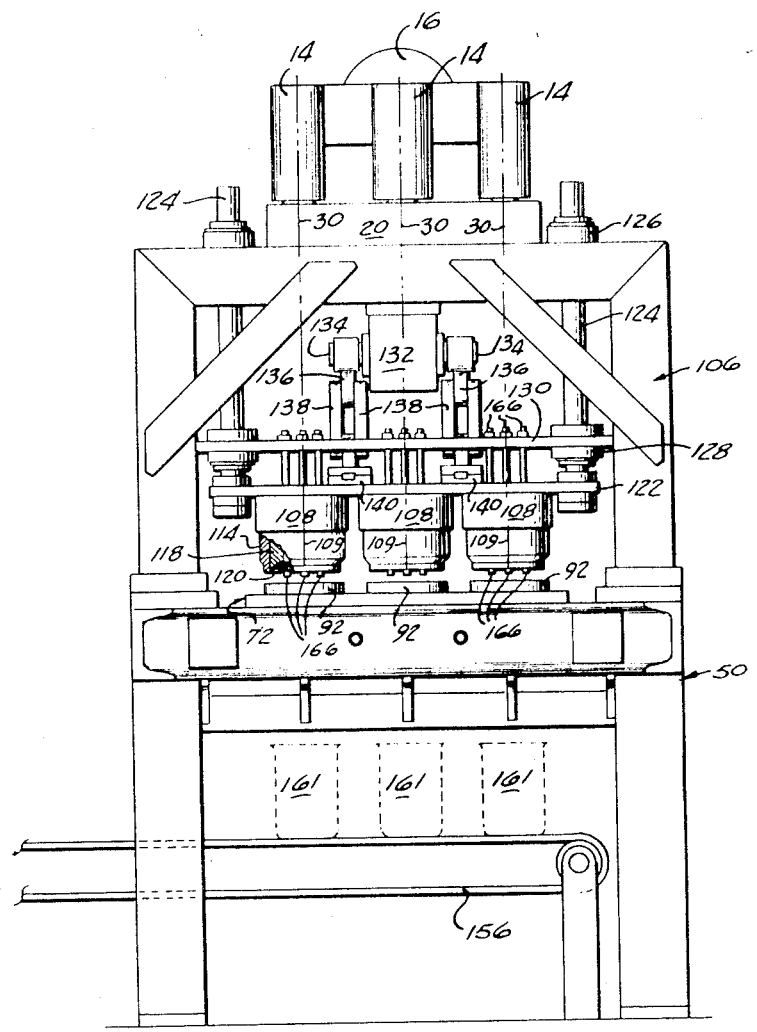
FIGURE 3 is a front view of the apparatus of this invention looking in the direction of the arrow in FIG. 1.

As shown in FIGS. 1 and 3, the frame 50 which supports the transfer bracket 56 and the locating bracket 72 is provided at its end 76 with an upwardly projecting extension 106 which is positioned in front of the front end of the blow molding machine frame 13. A plurality of trim or punch and cutter assemblies 108 (FIG. 3) are mounted on the framework extension 106, and as shown in FIG. 3, the assemblies 108 are positioned so that their center lines 109 are coplanar with the longitudinal center lines 30 of the die heads 14. In the trim positions of the articles 36, they are positioned below and in vertical alignment with the assemblies 108.

Since the assemblies 108 are identical, only one will be described in detail. Each assembly 108 includes an upright tubular guide bracket 110 having a radially inwardly directed lower flange 112. A container hold-down ring 114 is slidably mounted intermediate its ends on the inner surface of the flange 112 and is provided at its upper end with a radially outwardly extending flange 116. A tubular punch member 118 is slidably supported on the inner surface of the hold-down ring 114 and is formed at its lower end with an annular cutting edge 120 which is inclined with respect to a horizontal plane to provide more efficient cutting action. The upper end of the guide ring 110 and the upper end of the punch member 118 in each assembly 108 are connected to a cross plate 122 which is secured at its ends to upright guide rods 124 which are in turn slidably supported in upper and lower bearings 126 and 128, respectively, carried by the frame extension 106. The lower bearings 128 are mounted on a stationary frame plate 130 which is fixed at its ends to the frame 106.

A hydraulic motor unit 132 mounted on the frame extension 106 has a drive shaft 134, and the motor unit 132 is of well known type capable of rotating the shaft 134 in both clockwise and counterclockwise directions. Arms 136 are fixed at their upper ends on the ends of the shaft 134, and at their lower ends the arms 136 are pivotally connected to links 138 which are in turn pivotally connected to brackets 140 secured to the plate 122.

Figure 6:
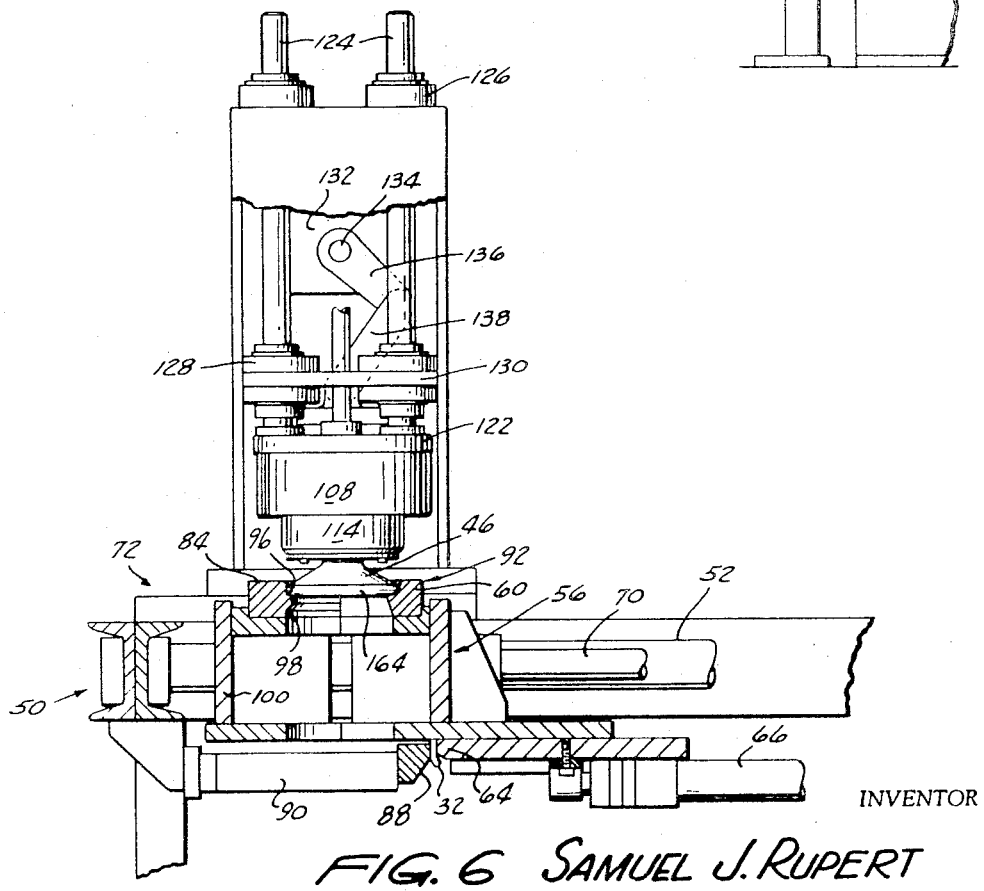
FIGURE 6 is a fragmentary side elevational view similar to FIG. 5 showing the cutter retracted, the finished container removed from the supporting nest, and only the unwanted excess scrape material remaining on the bracket.

When the shaft 132 is in a rotated position such that the arms 136 are in the position shown in FIG. 6, the plate 122 is in an upwardly moved position in which the assemblies 108 are above the nests 92 as shown in FIGS. 3 and 6. When the shaft 134 is rotated in a clockwise direction, from its position shown in FIG. 6, the plate 122 is moved downwardly so as to move the lower end of the hold-down ring 114 downwardly into the nest 92 and into engagement with an annular outer portion of the top wall 46 of the article 36 at a position above the nest shelf 96, as shown in FIGS. 5 and 5A. The hold-down ring 114 is free to slide upwardly in the guide ring 110, against the pressure of springs 144 which extend between the hold-down ring flange 116 and the plate 122. The springs 144 thus function to maintain the hold-down ring 114 in yielding engagement with the article 36. As the plate 122 is progressively moved downwardly, punch member 118 is moved downwardly so that the cutting edge 120 is moved into cutting engagement with first the article top wall 46 and then the side wall projection 44. The cutting edge 120 passes inside the inner edge of the shelf 96 so that it cooperates with the shelf 96 to cut, with a scissors action, the side wall projection 94. As shown in FIG. 5A, cutting edge 120 passes through the projection 44 at a position slightly outwardly from the container side wall 42. As a result, after the edge 120 has passed through the side wall extension 44, a small outwardly flared lip 150 is left on the upper end of the side wall 160 of the finished container 161 (FIG. 5A). The bottom end 119 of punch member 118 is concavely tapered to accommodate the convexly shaped article top wall 46 as shown in FIG. 5.

Each trim assembly 108 also includes an air nozzle 152 which extends downwardly through an axial opening in the punch member 118 and is mounted at its upper end on the plate 122. A flexible air supply conduit 154 is connected to each nozzle 152. As shown in FIG. 5, the nozzle 152 is of a size to telescope into the opening 48 in the article top wall 46 and is positioned relative to the punch member 118 so that when the punch member has cut through the side wall extension 44, the nozzle 152 projects into the interior of the article 36. At this time, air under pressure is supplied to the nozzle 152 so as to apply an air pressure to the bottom wall 40 of each of the articles 36 which have just been trimmed. This air pressure forces the finished containers 161 downwardly off the punch member 118 so that they fall downwardly onto a conveyor 156 disposed below the trim assemblies 108, as shown in FIG. 3. Each of the containers 161 is in a final finished form in which the tail 32 has been removed and the excess material at the upper end of the container has been removed. In the illustrated embodiment of the invention, the container 161 is adapted for use as an oil can in which a suitable top (not shown) is assembled with the lip 150 at the open upper end of the container. The conveyor 156 thus takes the finished containers 161 to a suitable fill or packing station.

Figure 7:
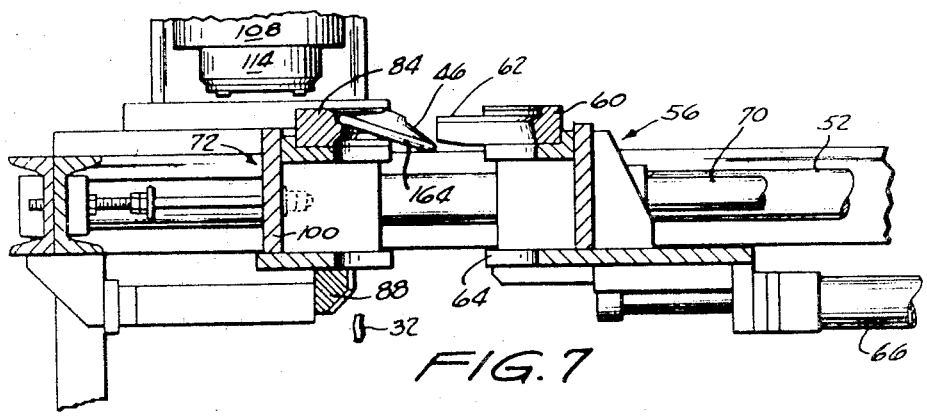
FIGURE 7 is another fragmentary side elevational view of the apparatus illustrating the return movement of the transfer and locating brackets toward their positions as shown in FIG. 1.

As soon as the air nozzles 152 have been supplied with air so as to eject the finished containers 161, the hydraulic motor unit 132 is reversed so as to move the shaft 134 in counterclockwise direction, as viewed in FIG. 5, to in turn move the plate 122 upwardly toward its upper position shown in FIG. 6. During such upward movement of the plate 122, the punch member 118 is first moved upwardly through the hold-down member 114, with the severed article top wall 46 adhering to the lower end 119 of the punch member 118. The hold-down ring 114 retains the scrap ring 164 which has been cut from the article 36 on the shelf 96 for the nest 92. A plurality of knockout pins 166, illustrated as being three in number, are secured to the stationary frame member 130 and are extended downwardly through guide openings 168 in the punch member 118 for each of the trim assemblies 108. Consequently, as the punch member 118 is moved upwardly, the knockout pins 164 engage the container top wall 46 on the bottom of the punch member 118 and knock it off so that it falls downwardly onto this scrap ring 164. The flange 112 on the ring guide 110 engages the flange 116 on the hold-down ring 114 and lifts the hold-down ring off the scrap ring 166. When the plate 122 is fully retracted, the trim assemblies 108 are in a clearance relation with the nests 92 and the scrap material supported thereon. The hydraulic cylinder assembly 68 is then actuated to retract the piston rod 70 so as to move the transfer bracket 56 to the right as viewed in FIG. 2 to its initial position illustrated in FIGS. 1 and 2 in which it is in position to intercept the next group of articles 36 falling downwardly from the mold sections 22. As the transfer bracket 56 moves to the right as viewed in FIG. 2, the springs 78 move the locating bracket 72 to the right along with the bracket 56. The scrap pieces 46 and 166 are thus moved with the brackets 56 and 72 as the brackets move to the right, until the frame member 100 on the locating brackets 72 engages the stop 80, as shown in FIG. 7, at which time the bracket 56 and the nest halves 60 move away from the bracket 72 and the nest halves 92. This terminates the support for the scrap 46 and 166 so that it then topples downwardly off the nest portion 92, as shown in FIG. 7. At this time the tail pusher bars 64 move away from the stripper bar 88 so as to release the tails 32 gripped therebetween. Suitable means (not shown) are provided for collecting the scrap material and returning it to the blow molding machine 12. The locating bracket 72 remains in its position illustrated in FIG. 7 in which it is in a position to engage the next group of three containers 36 moved toward it by the transfer bracket 56. The transfer bracket 56 continues its movement toward the right as viewed in FIG. 2 until it is in the position illustrated in FIG. 2 in which it will catch the next group of three articles 36 falling downwardly from the mold sections 22.

The apparatus 10 operates in a timed relation with the blow molding machine 12, so that by the time the transfer bracket 56 has been returned to its position shown in FIGS. 1 and 2, the blow molding machine 12 has completed a cycle and the machine 12 is in position to deliver three more articles 36 to the transfer bracket 56. It can thus be seen that the apparatus 10 operates in conjunction with the machine 12 to take articles 36 which have been formed to a predetermined shape in the machine 12 and automatically trim and finish the articles 36 so as to form containers 161 of a desired final shape. The apparatus 10 operates automatically since it is oriented with the tails 32 formed on the articles 36 and operates automatically to shear off the tails 32 and remove excess material from the tops of the articles 36. As shown in FIG. 5A, the slope of the lower end 119 of the punch member 118 is slightly greater than the slope of the top surface 46 of the container 36. This insures cutting engagement of the cutting edge 120 on the punch member 118 with the container top wall 46.

Figure 10:
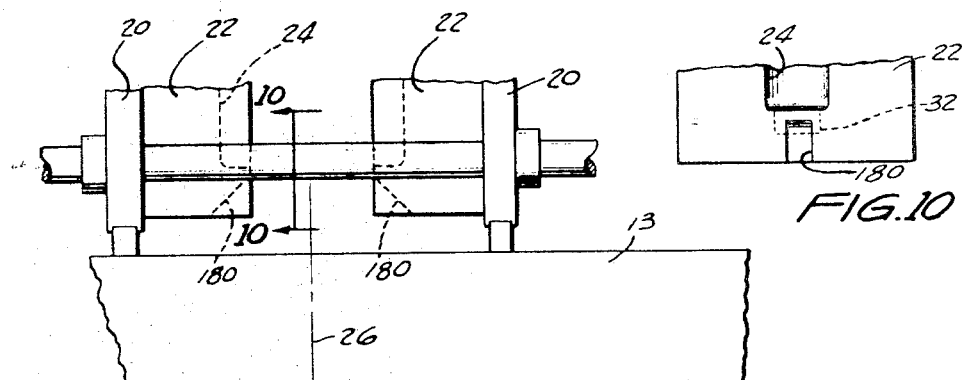
FIGURE 10 is a fragmentary detail sectional view looking substantially along the line 10—10 in FIG. 9.
Figure 9:
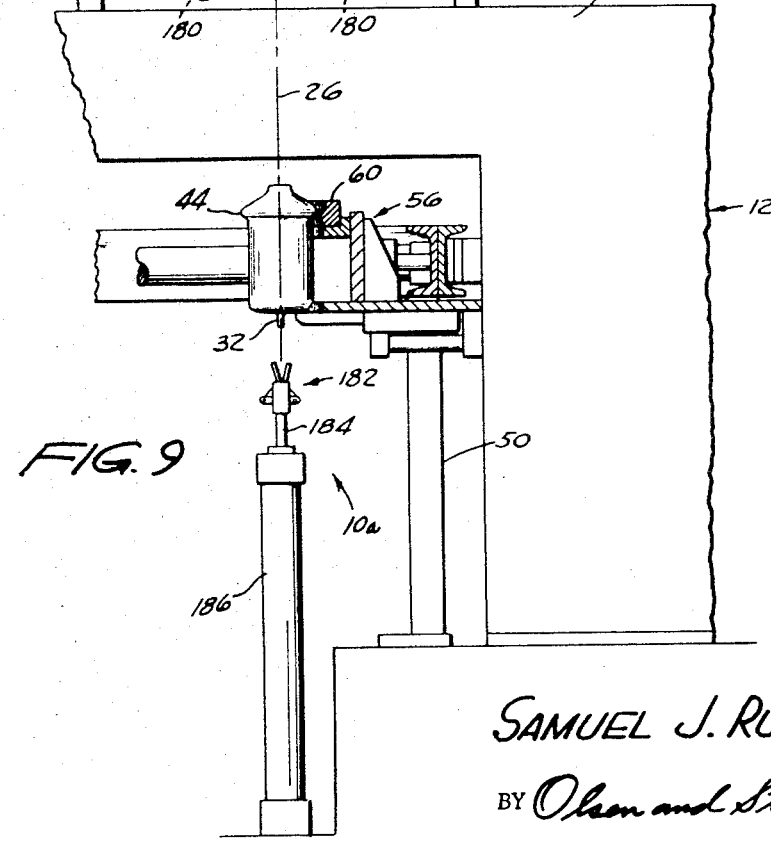
FIGURE 9 is a side elevational view of another form of apparatus that may be used in carrying out this invention in which the blow molded articles are positively moved downwardly onto the supporting bracket.

In the event it is desired to positively move the article 36 from the blow molding machine 12 onto the transfer bracket 56, instead of relying on the force of gravity, as in the case of the apparatus 10, the modified apparatus indicated at 10a in FIG. 9 is utilized. In the case of some articles 36 which are of a shape different from that illustrated, such a positive movement may be desirable. In FIG. 9, the mold sections 22 are shown in spaced apart positions prior to movement toward each other into engagement with a parison 18 such as shown in FIG. 1. The mold sections 22 are formed on their facing sides with notches 180 disposed below the mold cavity 24, and each notch 180 is of a length less than the length of the tail 32 normally formed on the bottom end of an article 36 blown in the mold sections 32, as shown in FIG. 10. The purposes of the notches 180 is to expose the tail 32, which is shown in broken lines in FIG. 10, so that the tail 32 can be gripped prior to the time the mold sections 22 are moved apart.

A finger or scissors assembly 182 is mounted on the upper end of a piston rod 184 for a fluid actuated cylinder assembly 186 which is mounted below the transfer bracket 56 and in a centered relation with the plane 26. On extension of the piston rod 184, finger assembly 182 is movable upwardly into the notches 180 and into gripping engagement with the tail 32. Consequently, when the molds 22 are moved apart, as shown in FIG. 10, the molded article 36 is supported on the finger assembly 182. The piston rod 184 is then retracted to move the molded article 36 downwardly, with the tail 32 being maintained in plane 26, as in the apparatus 10 previously described. The piston rod 184 continues its downward movement, until the side wall extension 44 on the molded article 36 engages the transfer bracket 56. Finger assembly 182 then releases the tail 32 so that the molded article 36 is supported on the transfer bracket 56 as in the apparatus 10. The piston rod 184 is further retracted so that the finger assembly 182 is in a clearance relation with the transfer bracket 56 during its horizontal movement in a direction toward the left as viewed in FIG. 9 toward the locating bracket 72.

The finger assembly 182 is automatically actuated to grip the tail 32 as the finger assembly 182 enters the notches 180, and the assembly 182 is automatically actuated to release the tail 32 at approximately the time the transfer bracket 56 engages the side wall extension 44. Since the details of the finger assembly 182 form no part of the present invention, the assembly 182 is not described in detail herein. For such a detailed description, reference is made to applicant's copending application Ser. No. 416,991, filed Dec. 9, 1964, also assigned to the assignee of this application.

It will be understood that the method of automatically trim finishing blow molded plastic articles which is herein disclosed and described is presented for purposes of explanation and illustration and is not intended to indicate limits of the invention.

What is claimed is:

1. The method of trimming a blow molded article having a generally cylindrical side wall, a radially outwardly bulbed top portion and a bottom wall provided with a depending tail located in a predetermined plane so as to form a finished open top container comprising the steps of:
    (a) applying an upwardly directed supporting force to said top portion so as to support said article from said top portion in a position in which said tail extends downwardly from the article and is disposed in said plane;
    (b) applying oppositely directed substantially horizontal gripping forces to said top portion of the article and moving said article in one direction substantially perpendicular to said plane;
    (c) applying a force to one side of said tail which is in a direction opposite to said one direction during said movement of said article and which is of a magnitude sufficient to tear said tail from the article;
    (d) locating said article in a predetermined position subsequent to removal of said tail; and
    (e) cutting downwardly through said top portion at a position radially inwardly from said supporting and gripping forces to separate said side and bottom walls from the remainder of said article whereby to form said open top container.

2. The method of trimming a blow molded article having a generally cylindrical side wall, a radially outwardly bulbed top portion and a bottom wall provided with a depending tail located in a predetermined plane so as to form a finished open top container comprising the steps of:
    (a) supporting said article in a position in which said tail extends downwardly from the article and is disposed in said plane;
    (b) applying a horizontal force to said article so as to move it in one direction substantially perpendicular to said plane;
    (c) applying a force to one side of said tail which is in a direction opposite to said one direction during said movement of said article and which is of a magnitude sufficient to remove said tail from the article;
    (d) providing a yielding force on the opposite side of said tail during the application of said removal force thereto;
    (e) locating said article with the tail removed in a predetermined position;
    (f) supporting said article at a position spaced above said bottom wall in said predetermined position;
    (g) cutting substantially said entire top portion from said article to form said finished container; and
    (h) moving said container downwardly from said predetermined position.

3. The method of trimming a blow molded article having a generally cylindrical side wall, a radially outwardly bulbed top portion and a bottom wall provided with a depending tail so as to form a finished open top container comprising the steps of:
    (a) supporting said article in a position in which said tail extends downwardly from the article and is disposed in a predetermined vertical plane;
    (b) applying a substantially horizontal directed force to one side of said tail which is of a magnitude sufficient to strip said tail from said bottom wall; and
    (c) subsequently cutting substantially said entire top portion from said article to form said finished container.

References Cited

UNITED STATES PATENTS

| | | | |
|---|---|---|---|
| 3,229,558 | 1/1966 | Harwood et al. | 83—914 X |
| 3,009,198 | 11/1961 | Kalman et al. | 83—914 X |

JAMES M. MEISTER, Primary Examiner

U.S. Cl. X.R.

83—54, 914; 225—93, 94

UNITED STATES PATENT OFFICE
CERTIFICATE OF CORRECTION

Patent No. 3,465,931          Dated September 9, 1969

Inventor(s) Samuel J. Rupert

It is certified that error appears in the above-identified patent and that said Letters Patent are hereby corrected as shown below:

Column 2, line 33, "conveniently" should be - - conventionally - -.
Column 5, line 20, "container 36 by the stripper bar portion 86 which oper-" should read - - containers 36 thereon engage the nest portions 84 and are - - . Column 7, line 61, "brackets" should be - - bracket - - .

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents